United States Patent
Damman et al.

(10) Patent No.: US 6,439,603 B2
(45) Date of Patent: *Aug. 27, 2002

(54) AIR BAG MODULE WITH VARIABLE INFLATION

(75) Inventors: Alex Scott Damman, Hilliard; Allen Richard Starner, Springboro; Therial Levell Alsup, Dayton, all of OH (US)

(73) Assignee: Delphi Technologies, Inc., Troy, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,991

(22) Filed: Oct. 13, 1999

(51) Int. Cl.[7] .............................................. B60R 21/26
(52) U.S. Cl. ....................................... 280/736; 280/739
(58) Field of Search ................................ 280/734, 736, 280/738, 739, 740, 742

(56) References Cited

U.S. PATENT DOCUMENTS

| | | | | |
|---|---|---|---|---|
| 3,324,656 A | * | 6/1967 | Bradshaw, Jr. ............... | 280/734 |
| 4,877,264 A | * | 10/1989 | Cuevas ....................... | 280/734 |
| 5,320,379 A | * | 6/1994 | Burnard et al. ............. | 280/739 |
| 5,330,226 A | | 7/1994 | Gentry et al. ............... | 280/735 |
| 5,366,242 A | | 11/1994 | Faigle et al. ................ | 280/736 |
| 5,413,378 A | | 5/1995 | Steffens, Jr. et al. ........ | 280/735 |
| 5,695,214 A | | 12/1997 | Faigle et al. ................ | 280/735 |
| 5,707,078 A | | 1/1998 | Swanberg et al. .......... | 280/739 |
| 5,743,558 A | * | 4/1998 | Seymour ..................... | 280/739 |
| 5,918,901 A | * | 7/1999 | Johnson et al. ............. | 280/739 |
| 6,017,060 A | * | 1/2000 | Wilson et al. | |
| 6,039,346 A | * | 3/2000 | Ryan et al. .................. | 280/736 |
| 6,065,773 A | * | 5/2000 | Klinger et al. .............. | 280/736 |
| 6,082,765 A | * | 7/2000 | Bowers et al. .............. | 280/739 |
| 6,089,600 A | * | 7/2000 | Schenck et al. ............. | 280/742 |
| 6,131,942 A | * | 10/2000 | Fuji et al. .................... | 280/739 |
| 6,213,502 B1 | * | 4/2001 | Ryan et al. .................. | 280/736 |

* cited by examiner

Primary Examiner—Brian L. Johnson
Assistant Examiner—Christopher Bottoroff
(74) Attorney, Agent, or Firm—Kathryn A. Marra

(57) ABSTRACT

Variable deployment performance by controlling the quantity and fluid flow path of the inflator gas into or out of an air bag module according to the present invention. The air bag module includes a vent opening and a cushion retainer diffuser including a plurality of diffuser openings which permits fluid communication between an annular cavity and an air bag cushion. The vent opening provides a fluid path for the inflator gas to flow from the annular cavity to outside of the air bag module. For full level deployment, the vent opening is closed and therefore the inflator gas is not permitted to flow away from the air bag module but instead flows into the air bag cushion. For low level deployment, the volume of inflator gas which flows into the air bag cushion is controlled by selecting the ratio between the cross-sectional area of the diffuser openings and the cross-sectional area of the vent opening. For example, for reduced low level deployment, the cross-sectional area of the vent opening is increased in relation to the cross-sectional area of the diffuser openings. Conversely, for increased low level deployment, the cross-sectional area of the vent opening is decreased in relation to the cross-sectional area of the diffuser openings. Accordingly, the selective control of the ratio acts as a tuning mechanism by which different low level inflator outputs can be achieved. Deployment module levels between low level and high level can be achieved by controlling the timing of when the vent opening is closed.

43 Claims, 4 Drawing Sheets

AIR BAG MODULE WITH VARIABLE INFLATION

TECHNICAL FIELD

The present invention relates generally to vehicle supplemental inflatable restraint systems and, more particularly, to an air bag module that provides variable output inflation of an air bag cushion from a single inflator.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

Air bag passive restraint systems include an inflator, which produces gas to inflate the air bag cushion. Known inflators for air bag modules are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas created flows through an outlet to the cushion. A third type is the hybrid or augmented type. This type includes a pressure vessel containing stored pressurized gas and a gas generator. When the generator is ignited, the resultant gas flows with and heats the stored gas going to the cushion through the pressure vessel outlet.

It is also known to inflate the cushion at a relatively low rate under low level deployment conditions, such as a sudden low level deceleration, and at a relatively high rate under high level deployment conditions, such as a sudden high level deceleration. Devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide fall level inflation. It is also known in the art to use a system having two discrete inflators to accomplish dual level inflation. In these types of systems, two discrete inflators are deployed at the same time or at a delayed time depending upon the severity of the sudden deceleration.

SUMMARY OF THE INVENTION

This invention offers advantages and alternatives over the prior art by providing an air bag module which offers variable deployment performance by controlling the quantity and fluid flow path of the inflator gas into or out of the air bag module. The air bag module includes an inflator for generating inflator gas for inflation of an air bag cushion. The air bag module includes a cushion retainer (diffuser) having a vent opening and an annular cavity which is disposed about the inflator. The cushion retainer includes a plurality of diffuser openings which permits fluid communication between the annular cavity and the air bag cushion. The air bag module further includes an annular base plate, a pad retainer, and an adapter plate disposed about the inflator. The annular base plate, pad retainer, and adapter plate include openings which define a vent opening to provide a fluid path for the inflator gas to flow from the annular cavity to outside of the air bag module. For full level deployment, the vent opening is closed and therefore the inflator gas is not permitted to flow away from the air bag module but instead flows into the air bag cushion. The degree of reduced level deployment of the air bag cushion is dependent upon the volume of the gas directed away from the air bag cushion. In accordance with the present invention, the volume of inflator gas which flows into the air bag cushion is controlled by selecting the ratio between the cross-sectional area of the diffuser openings and the cross-sectional area of the vent opening. For example, for a low reduced level deployment, the cross-sectional area of the vent opening is increased in relation to the cross-sectional area of the diffuser openings. This may be achieved in a variety of ways, including reducing the cross-sectional area of the diffuser openings or by reducing the number of diffuser openings or by increasing the relative vent of cross-sectional area. Conversely, for increased low level deployment, the cross-sectional area of the vent opening is decreased in relation to the cross-sectional area of the diffuser openings and/or the number or size of the diffuser openings are increased so that a greater volume of inflator gas is directed toward the air bag cushion. Accordingly, the selective control of the ratio acts as a tuning mechanism by which different low level inflator outputs can be achieved.

The air bag module also includes an actuator assembly including a movable member which is movable relative to the vent opening for restricting fluid flow through the vent opening under predetermined deployment conditions. The actuator assembly has an actuator for moving the movable member and in an exemplary embodiment the actuator comprises a pyrotechnic device. In the illustrated and exemplary embodiment, the movable member comprises a slide mechanism or a stopper mechanism which closes the vent opening under predetermined deployment conditions and prevents the inflator gas from flowing away from the air bag cushion. Furthermore, controlling the timing of the vent closure provides a way to obtain variable inflation between the low and high level performance.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawing in which.

DETAILED DESCRIPTION OF THE INVENTION

Figure 1:
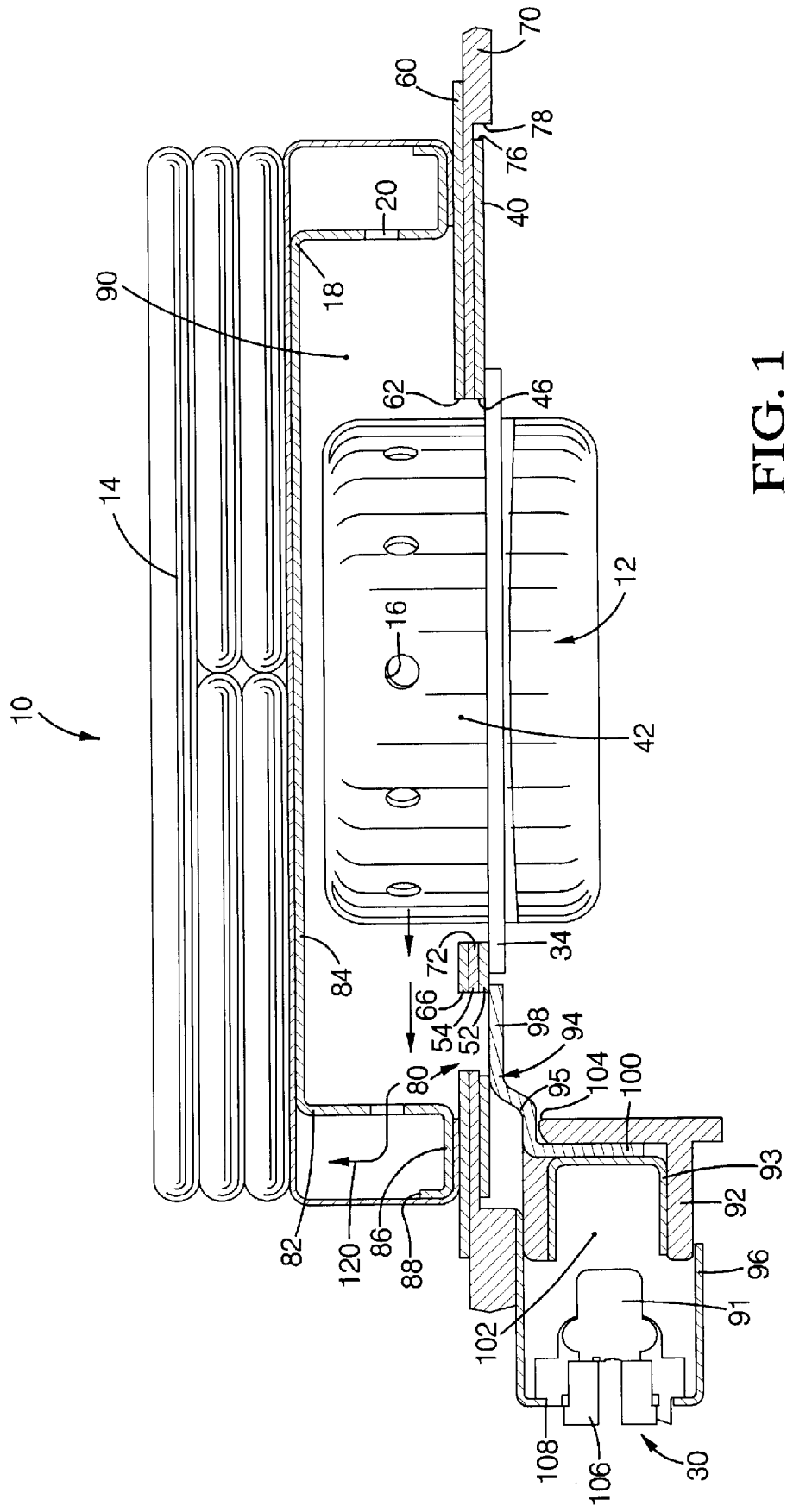
FIG. 1 is a sectional side view of an air bag module embodying a first embodiment of the present invention shown during full level deployment of an air bag cushion.
Figure 2:
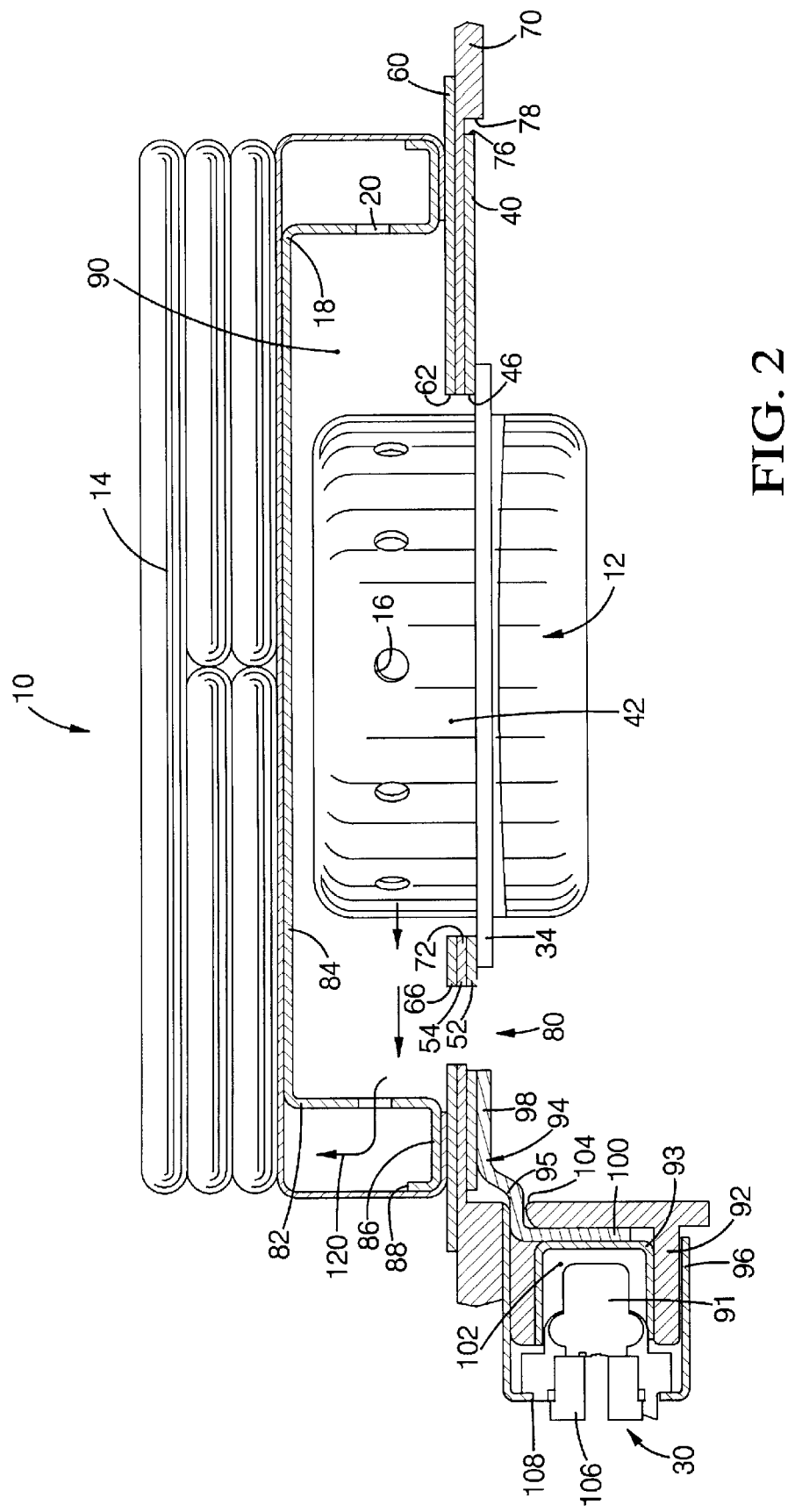
FIG. 2 is a sectional side view of the air bag module of FIG. 1 shown during reduced level deployment of the air bag cushion.

Referring to the FIGS. 1–2, an air bag module according to a first embodiment is generally designated at 10. The air bag module 10 is suitably mounted to a central hub of a steering wheel (not shown). The air bag module 10 includes an inflator 12 for generating inflator gas upon the sensing of predetermined vehicle conditions, i.e. rapid deceleration, to inflate an air bag cushion 14. Inflator 12 has a predetermined number of vent ports 16 radially disposed within inflator 12. An annular cushion retainer diffuser 18 is disposed about the inflator for directing gases from the inflator 12 to the air bag cushion 14. The cushion retainer 18 further includes a predetermined number of diffuser openings 20 which fluidly communicate with the air bag cushion 14 and permit inflator gas to pass into and inflate the air bag cushion 14 under deployment conditions. The inflator 12 shown is commonly used for an air bag module 10 installed in a driver side of a vehicle to protect the driver thereof. One skilled in the art, however, will recognize that the air bag module 10 described hereinafter may be used for other passive restraints, i.e., passenger side air bag modules and side impact air bag modules.

Upon actuation of the inflator 12 in response to a sudden deceleration of a motor vehicle, heated gas discharges from the inflator vent ports 16 disposed in the inflator 12 to inflate the air bag cushion 14.

A controller (not shown), e.g., a sensing and actuating system, generates an ignition signal to the inflator 12. In response to the sensed signals, the controller provides an ignition signal to the inflator 12 to initiate deployment inflation of the air bag cushion 14 in accordance with a predetermined level of deceleration. In response to the ignition signal, the inflator 12 releases an appropriate predetermined volume of gas into the air bag cushion 14 through the vent ports 16 of the inflator 12. The level of deployment of the air bag cushion 14 is partially dependent upon on the actuation of a slide actuator assembly 30 slidably arranged to selectively restrict or prevent gas flow away from the air bag cushion 14, as will be described hereinafter. For example, for the lowest level of module deployment energy, no action is required by the slide actuator assembly 30.

Inflator 12 may be of any conventional construction for generating inflator gas to inflate the air bag cushion 14. Advantageously, the inflator 12 is preferably a single stage inflator which outputs inflator gas to inflate the air bag cushion 14. The inflator 12 has a generally cylindrical body portion and a flange 34 that suitably secures to an adapter plate 40. The vent ports 16 are preferably formed in a side wall 42 of inflator 12 and extend around side wall 42 of inflator 12 in a radial manner and it is understood that the number and dimension of the vent ports 16 may be varied according to the precise application and configuration of the inflator 12. An initiator or pyrotechnic device (not shown) disposed within the inflator 12 ignites pyrotechnic material which generates heated gas that discharges through the discharge vent ports 16 to inflate the air bag cushion 14.

As shown in FIG. 1, the adapter plate 40 supports both the inflator 12 and the slide actuator assembly 30. The inflator 12 is mounted within a central opening 46 of the adapter plate 40 by known techniques, including the use of a plurality of threaded studs (not shown) extending from a bottom surface thereof. The air bag module 10 further includes an annular base plate 60, formed of a rigid material, having a central opening 62 for receiving the inflator 12 therethrough. A pad retainer 70 is secured to a bottom surface of the base plate 60 to provide a means for securing an air bag cover or pad (not shown) to the base plate 60. The pad retainer 70 also includes a central opening 72 for receiving the inflator 12 to permit the inflator 12 to extend into the air bag cushion 14.

The adapter plate 40 includes a first slot 52 disposed about the central opening 46 which provides a gas venting path for directing inflator gas from the air bag cushion 14. The pad retainer 70 includes an arcuate slot 54 which is aligned with the first slot 52 to permit inflator gas to flow therethrough and away from the air bag cushion 14. The base plate 60 also includes an arcuate slot 66 formed therein proximate the central opening 62. Arcuate slot 66 aligns with both the first and second slots 52 and 54 to provide the gas venting path for directing inflator gas from the air bag cushion 14 when slide actuator assembly 30 is in a retracted position as illustrated in FIG. 2. The slide actuator assembly 30 is disposed below the first slot 52 of the adapter plate 40 and the arcuate slot 54 of the pad retainer 70 to permit the slide actuator assembly 30 to block both first, second, and third slots 52, 54, 66 upon actuation thereof. In other words, the first, second, and third slots 52, 54, 66 comprise a vent opening generally indicated at 80, wherein the vent opening 80 permits inflator gas to flow from the inflator 12 and away from the air bag cushion 14. The slide actuator assembly 30 is designed to completely close vent opening 80 under predetermined deployment conditions and thereby prevent the inflator gas from flowing away from the air bag cushion 14 and instead causes the inflator gas to flow into the air bag cushion 14.

In the illustrated embodiment, the slide actuator assembly 30 is mounted to the pad retainer 70 and contacts and communicates with the adapter plate 40. More specifically, the slide actuator assembly 30 is mounted to a bottom surface of the pad retainer 70 at the outer periphery of the inflator 12. The pad retainer 70 includes a bottom recessed platform 76 formed by an annular shoulder 78. The recessed platform 76 is sized to receive the adapter plate 40 and also permits lateral movement of slide actuator assembly 30 so that the vent opening 80 may be closed under predetermined deployment conditions and upon actuation of the slide actuator assembly 30.

The cushion retainer 18 includes an annular side wall 82 and an upper horizontal wall 84 that cooperatively define an annular cavity 90 opening downwardly towards the base plate 60. Annular side wall 82 includes an outer flange 86 which extends therefrom, wherein the outer flange 86 includes an upwardly extending lip 88 about its outer periphery. The air bag cushion 14 is secured between the outer flange 86 and the base plate 60 to retain the air bag cushion 14 during deployment.

The air bag cover or pad (not shown) is commonly used in air bag modules and is designed to fit over the base plate 60, cushion retainer 18 and the air bag cushion 14 and fastens to the pad retainer 70. The cover is preferably molded of a plastic material. The cover overlies the air bag cushion 14 and inflator 12 and maintains the air bag cushion 14 in a folded condition prior to air bag deployment.

The slide actuator assembly 30 includes a pyrotechnic initiator 91, a liner 92 and a slide 94 disposed within a generally cylindrical housing 96. The slide 94, preferably formed of metal, is a generally L-shaped member having horizontal and vertical portions 98, 100, respectively. The vertical portion 100 of the slide 94 engages the liner 92 and the horizontal portion 98 rides along the adapter plate 40 and is adjacent the flange 34 of inflator 12 during full deployment conditions, as shown in FIG. 1. The width of the horizontal portion 98 is sufficient to cover the vent opening 80 during full deployment of the air bag module 10.

The liner 92, formed preferably of a polymeric material, is substantially cylindrical having an inner cavity 102 that opens at a bottom surface thereof to receive the initiator 90. The liner 92 includes a slot 104 at one end thereof for receiving and retaining the vertical portion 100 of the slide 94, which seats against an annular liner shell 93 disposed within liner 92. Thus, the slide 94 is secured to liner 92 so that actuation of pyrotechnic initiator 91 causes the liner 92, the liner shell 93 and the horizontal portion 98 to travel in a direction toward vent opening 80. Leads 106 extending from the initiator 90 extend through an opening 108 at one end of the housing 96 to permit interconnection with the controller (not shown). The initiator 90 includes a recess for receiving and snapfitting thereto a connector (not shown) that interconnects the initiator 90 and the controller. The liner 92 and the slide 94 are releasably secured within the housing 96 by known techniques including the use of a pair of opposing spring tabs (not shown) disposed on the liner 92, wherein the spring tabs engage a pair of complementary slots (not shown) formed in the housing 96. The liner 92 may further include a guide tab (not shown) that extends from a side wall of the liner 92 which slidably engages a slot disposed at an edge of the housing 96. The guide tab guides the travel of and prevents rotation of the liner 92 and slide 94 upon firing of the initiator 90 during full deployment of the air bag cushion 14.

According to the present invention, upon actuation of inflator 12, gas pressure is built up in the cushion retainer 18 and more specifically, the gas pressure within annular cavity 90 builds up as inflator gas flows through vent ports 16 of inflator 12 into the annular cavity 90. This pressurized gas within annular cavity 90 flows through diffuser openings 20 and into the air bag cushion 14 and also is permitted to flow through vent opening 80 for venting of a portion of the inflator gas away from the air bag module 10 when vent opening 80 is opened. The degree of reduced level deployment of the air bag cushion 14 is dependent upon the volume of the gas directed away from the air bag cushion 14. Accordingly, the volume of inflator gas vented from the air bag module 10 is determined in part by the number of diffuser openings 20 and cross-sectional area of the diffuser openings 20 and the cross-sectional area of the vent opening 80 formed by first, second, and third slots 52, 54, 66.

Thus, the ability to variably control the deployment output of the air bag module 10 of the present invention results from the control over the amount of inflator gas produced by the inflator 12 and the ratio between the cross-sectional area of the diffuser openings 20 in relation to the cross-sectional area of vent opening 80 and the timing of the closure of vent opening 80. For example, for reduced level deployment, the cross-sectional area of vent opening 80 is increased in relation to the cross-sectional area of diffuser openings 20. This may be achieved by either reducing the cross-sectional area of each of the diffuser openings 20 or by reducing the number of diffuser openings 20 or by increasing the cross-sectional area of vent opening 80. Conversely, for increased low level deployment, the cross-sectional area of vent opening 80 is decreased in relation to the cross-sectional area diffuser openings 20 by decreasing the cross-sectional area of vent opening 80, increasing the diffuser opening cross sectional area or increase the number of diffuser openings 20 so that a greater volume of inflator gas is directed toward the air bag cushion 14 and not through vent opening 80. After the inflator gas is produced by the inflator 12, the inflator gas is forced from annular cavity 90 by a pressure build up in the annular cavity 90. The inflator gas produced by the inflator 12 is produced at a rate greater than the fluid flow rate of the inflator gas through the diffuser openings 20 due to the number of diffuser openings 20 formed in the cushion retainer 18 and/or the cross-sectional area of the diffuser openings 20 and therefore the gas within the annular cavity 90 becomes pressurized and is controllably vented through vent opening 80 during reduced level deployment conditions. By controlling the cross-sectional area of vent opening 80, the amount of inflator gas which is permitted to flow away from the air bag cushion 14 and the rate at which the inflator gas flows are likewise controlled. One of skill in the art would appreciate that the cross-sectional area of diffuser openings 20 and vent opening 80 may be varied by changing the shape or size of these openings.

In other words, the diffuser openings 20 have a first cross-sectional area and the vent opening 80 has a second cross-sectional area. According to the present invention, the deployment performance of the air bag module 10 is variable because the ratio actually comprises a selectable ratio and is tunable depending upon the desired deployment performance. First, the ratio is selectable because the air bag module 10 may be designed having predetermined cross-sectional areas with respect to the diffuser openings 20 and vent opening 80 and second, vent opening 80 may be left open, closed or closed at a time after the inflator gas begins to flow but before the inflator 12 is finished generating or releasing gas. For example, when vent opening 80 is closed none of the gas flows away from the air bag cushion 14 but instead the inflator gas flows into the air bag cushion 14 through the diffuser openings 20. When vent opening 80 is open, the precise amount of inflator gas which flows to the air bag cushion 14 and the amount which flows away from the air bag cushion through the vent opening 80 is controlled by selecting the desired ratio between the cross-sectional area of diffuser openings 20 and the cross-sectional area of vent opening 80. For example, when the ratio is about 10:1, in that the cross-sectional area of the diffuser openings 20 is ten (10) times greater than the cross-sectional area of vent opening 80, approximately 70% of the inflator gas flows to the air bag cushion 14, while the remaining portion flows through vent opening 80. This results in less than full level deployment of the air bag cushion 14. When the ratio is varied to about 1:3, only approximately 45% of the inflator gas flows into the air bag cushion 14 because the cross-sectional area of the vent opening 80 is now three (3) times greater than the cross-sectional area of the diffuser openings 20. At a ratio of about 2:3, approximately 51% of the inflator gas flows into the air bag cushion 14. Accordingly, by carefully controlling and selecting the ratio, variable inflator output is achieved.

Figure 3:
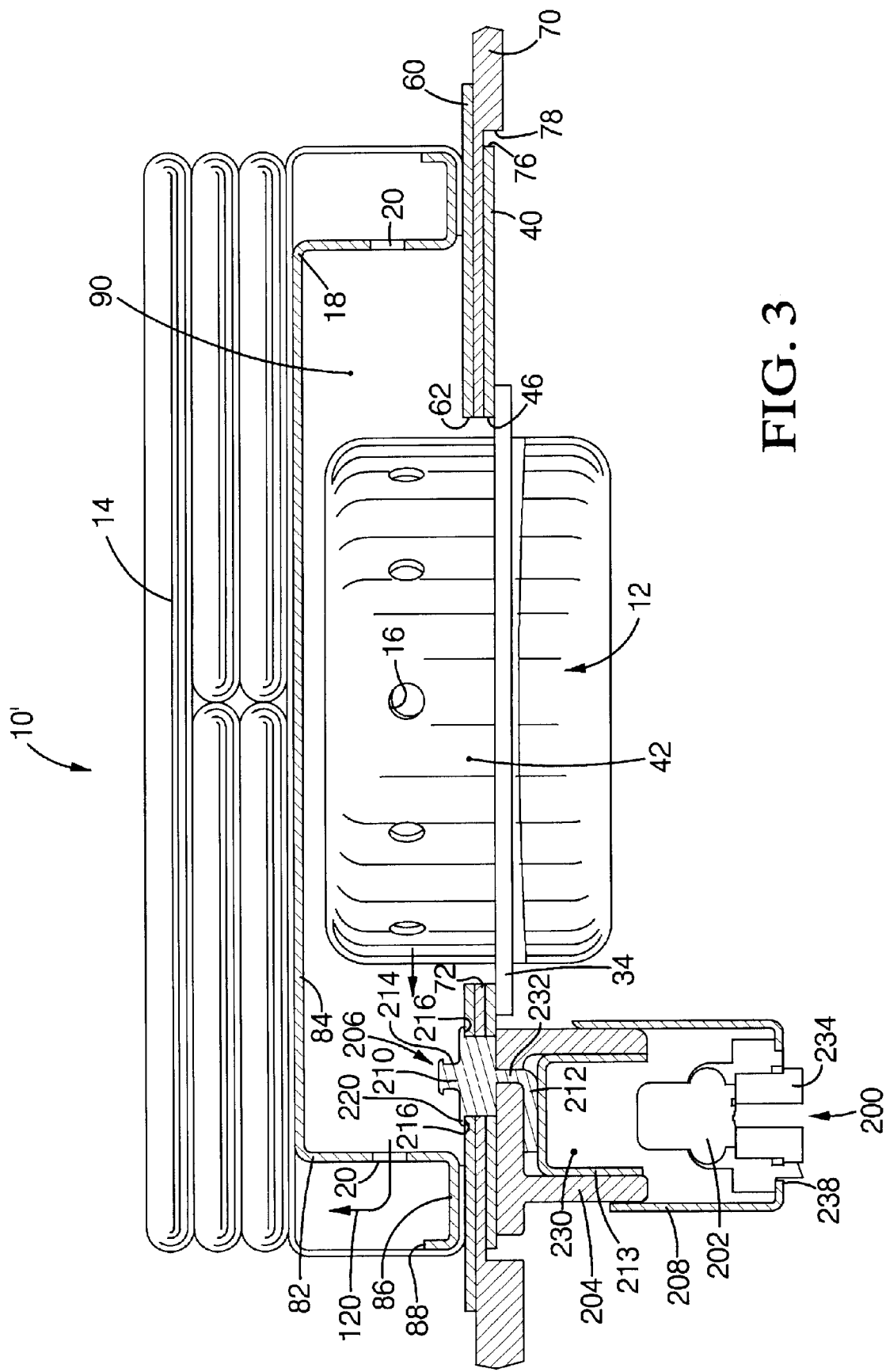
FIG. 3 is sectional side view of an air bag module embodying a second embodiment of the present invention shown during full level deployment of an air bag cushion.
Figure 4:
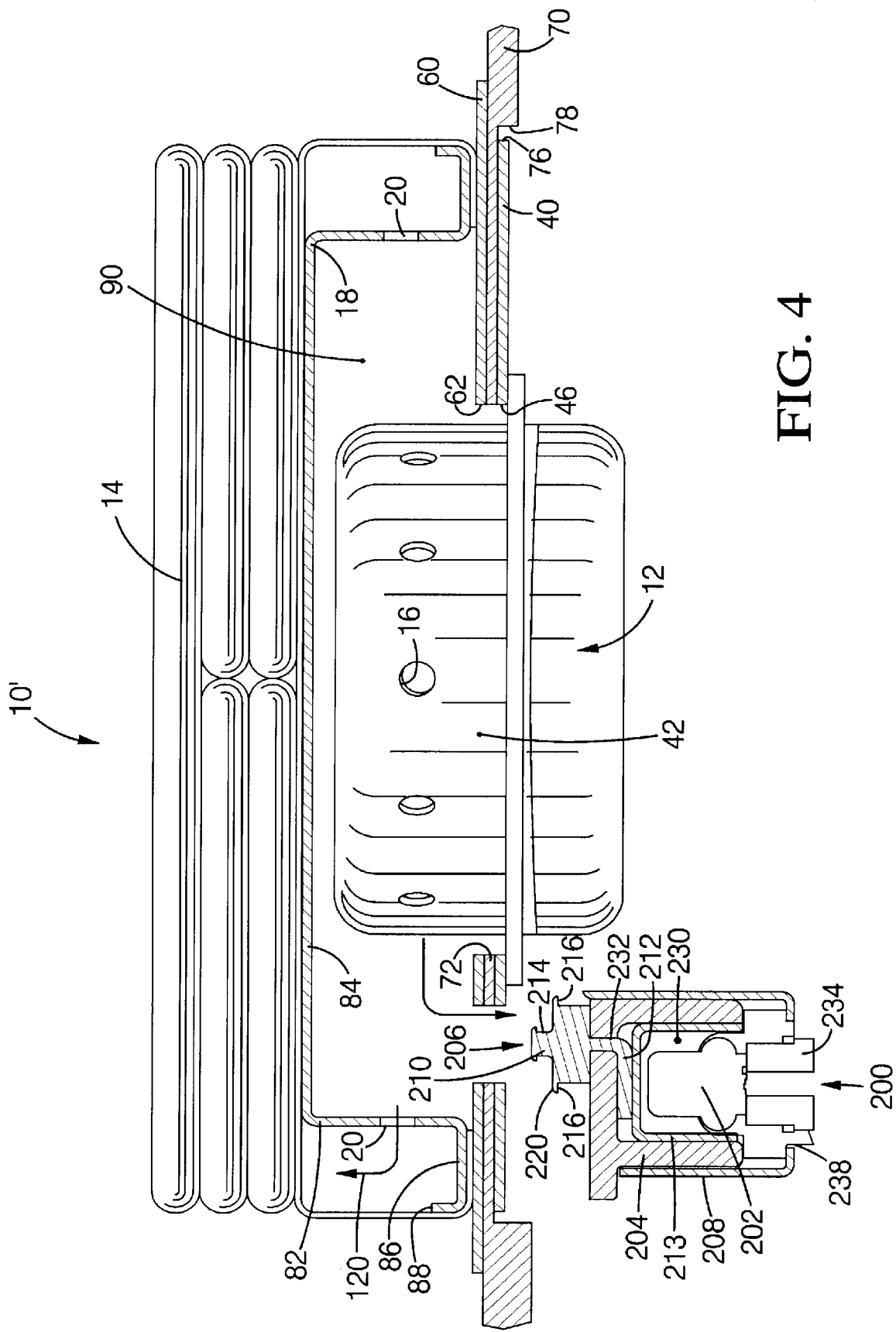
FIG. 4 is sectional side view of the air bag module of FIG. 3 shown during reduced level deployment of the air bag cushion.

Referring now to FIGS. 3 and 4 in which a second embodiment of an air bag module is illustrated and generally indicated at 10'. In this embodiment, slide actuator assembly 30 is replaced with a stopper mechanism 200. Stopper mechanism 200 is pyrotechnically actuated to either open or close vent opening 80. As shown in FIG. 3, stopper mechanism 200 is in a closed position and the inflator gas is prevented from flowing through vent opening 80 away from the air bag cushion 14 resulting in full level deployment. Similar to slide actuator assembly 30, the stopper mechanism 200 includes a pyrotechnic initiator 202, a liner 204, and a stopper 206 disposed within a generally cylindrical housing 208. Stopper 206 has a base portion 210 which acts to plug vent opening 80 when pyrotechnic initiator 202 is actuated and a generally L-shaped member 212 which connects with base portion 210 and extends downwardly therefrom and seats against an annular liner shell 213 disposed within liner 204. L-shaped member 212 is preferably integrally formed with the base portion 210 and in the exemplary embodiment, L-shaped member 212 is secured to annular liner shell 213 so that actuation of pyrotechnic initiator 202 causes liner 204, annular liner shell 213 and stopper 206 to travel within housing 208 in a direction toward vent opening 80.

Base portion 210 includes a neck 214 and an annular shoulder 216 intermediate the L-shaped member 212 and the neck 214. Annular shoulder 216 in part defines an annular flange 220 which as a diameter greater than the diameter of the remaining portions of base portion 210. The diameter of vent opening 80 is likewise less than the diameter of annular flange 220. Because at least the annular flange 220 and preferably the base portion 210 is formed of a sufficiently resilient material, stopper 206 intimately fits within the vent opening 80 and once annular flange 220 clears the walls defining vent opening 80, it radially flexes outwardly so that the annular flange 220 seats against an upper surface of the annular base plate 60 and prevents fluid communication between the annular cavity 90 and the outside of the air bag module 10 through the vent opening 80.

The liner 204 is substantially cylindrical and includes an inner cavity 230 that opens at a bottom surface thereof to receive the pyrotechnic initiator 202. The liner 204 includes a slot 232 at an upper end thereof for receiving and retaining the L-shaped member 212. Leads 234 extending from the pyrotechnic initiator 202 extend through an opening 238 at one end of the housing 208 to permit interconnection with the controller. As previously discussed with reference to slide actuator assembly 30, liner 204 and annular liner shell 213 along with stopper 206 are releasedly secured within the housing 208.

Upon actuation of the pyrotechnic initiator 202, the liner 204 including the annular liner shell 213 and the L-shaped member 212 of the stopper 206 are driven within the housing 208 toward the vent opening 80 causing the closure of the vent opening 80. Similar to the first embodiment, shown in FIGS. 1 and 2, stopper mechanism 200 may be actuated simultaneously with the pyrotechnic initiator of inflator 12 or may be delayed for a period of time before stopper mechanism 200 is actuated subsequent to the pyrotechnic initiator of the inflator 12. FIG. 3 illustrates stopper mechanism 200 in a full level deployment position where inflator gas is prevented from flowing away from the air bag cushion 14 and all of the inflator gas is directed into the air bag cushion 14. FIG. 4 illustrates stopper mechanism 200 in a reduced level deployment position where vent opening 80 is open and inflator gas is permitted to flow from the annular cavity 90 to the outside of the air bag module 10 by flowing through the vent opening 80.

Referring to FIGS. 1–2, in the operation of the air bag module 10, the default or initial position of the slide 94 may be disposed in the retracted position shown in FIG. 2 wherein the vent opening 80 is open to permit gas flow from the inflator 12 to be directed away from the air bag cushion 14. Likewise in air bag module 10' of FIGS. 3 and 4, the default position of stopper 206 may be disposed in the retracted position shown in FIG. 4. Upon actuation of the air bag module 10 under full level deployment, as shown in FIG. 1, the controller actuates the pyrotechnic initiator of the inflator 12 to ignite the pyrotechnic material to generate heated gas that discharges from the vent ports 16 of the inflator 12. Simultaneously or after a delay interval, the controller fires the pyrotechnic initiator 91 of the slide actuator assembly 30 which propels the liner and slide 94 in a first direction toward the inflator 12, overcoming the retention force of the spring tabs of the liner. The flange 34 provides a stop for the travel of the slide to properly position the slide 94 over the vent opening 80 and forces all the discharged gas from the inflator 12 along a first fluid flow path 120 into the air bag cushion 14. In other words, all of the discharged gas flows through vent ports 16 of the inflator 12 and through the diffuser openings 20 of the cushion retainer 18 and into the air bag cushion 14 for inflation thereof. The recessed platform 76 formed in the pad retainer 70 is designed to accommodate slide 94 and more specifically the horizontal portion 98 travels within the recessed platform 76 so that the horizontal portion 98 lies flush against the adapter plate 40 and slidably travels thereacross during actuation of slide actuator assembly 30. In the exemplary and illustrated embodiment, the slide 94 includes a bent portion 95 between the horizontal and vertical portions 98, 100, respectively. Bent portion 95 is a generally S-shaped segment of the slide 94 and is designed to permit slide 94 to extend from the housing 96 so that the horizontal portion 98 lies flush against the adapter plate 40 and selectively restrict or block the vent opening 80.

Upon actuation of the air bag module 10 under reduced level deployment conditions, the controller does not fire the pyrotechnic initiator 91 which maintains the slide 94 in the initial position as shown in FIG. 2 preventing the slide from restricting the vent opening 80. For air bag module 10', pyrotechnic initiator 202 is not fired. The vent opening 80, therefore, provides a secondary fluid flow path 140 (FIG. 2) for directing a predetermined amount of gas away from the air bag cushion 14 and thereby inflates the air bag cushion 14 at a reduced deployment level. Under these conditions, only a portion of the inflator gas flows through diffuser openings 20 from the annular cavity 90 to inflate the air bag cushion 14, while the remaining inflator gas flows away from the air bag cushion 14 through the vent opening 80 and thereby exits the air bag module 10. In other words, the inflator gas flows both according to the first fluid flow path 120 and the secondary fluid flow path 140.

For intermediate level deployment conditions, the controller is designed so that the pyrotechnic initiator 91 is fired after a predetermined time interval has passed. More specifically, the level of reduced deployment, as well as the level of full deployment, may be varied by providing a time delay between the firing of the initiator of the inflator 12 and the firing of the pyrotechnic initiator 91 of the slide actuator assembly 30. For example, the reduced level of deployment may be increased by firing the pyrotechnic initiator 91 of the slide actuator assembly 30 a predetermined time period after firing the initiator of the inflator 12, which directs the inflator gas away from the air bag cushion 14 for a shorter period of time.

One of skill in the art will further appreciate that the default position of the slide 94 may be in the restricted position as shown in FIG. 1, wherein the pyrotechnic initiator 91 of the slide actuator assembly 30 is not ignited under full level deployment conditions. During reduced level deployment conditions, the pyrotechnic initiator is ignited to move the slide 94 in a second direction away from the inflator 12 to the open, unrestricted position shown in FIG. 2.

While the air bag module 10 was described as having a separate base plate 60 and cushion retainer 18, one will appreciate that the cushion retainer 18 may be combined with the base plate 60 to form a single integral plate having annular cavity 90 and diffuser openings 20 of the cushion retainer 18. It being understood that the above-discussed alternative embodiments and modifications to air bag module 10 are equally applicable to air bag module 10'.

The present invention overcomes the deficiencies of the prior art and offers a more versatile inflator by permitting control over the moles of gas sent into the air bag cushion by varying the ratio between the cross-sectional area of diffuser openings 20 and vent opening 80 so that a desired and predetermined amount of inflator gas is directed into the air bag cushion 14 for deployment thereof.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An air bag module for restraint of an occupant in a vehicle, the air bag module comprising:
    an air bag cushion;
    an inflator being activatable to discharge inflator gas for inflating the air bag cushion, the inflator having a plurality of discharge ports through which the inflator gas is discharged;
    a diffuser having a cavity disposed adjacent the inflator, the diffuser having a plurality of diffuser openings formed therein to provide fluid communication between the cavity and the air bag cushion, the plurality of diffuser openings providing a first fluid path between the inflator and the air bag cushion, the diffuser openings having a first cross-sectional area;
    a plate disposed about the inflator, the plate including a vent opening which provides a second fluid path to expel the inflator gas from the air bag module, the vent opening having a second cross-sectional area;
    an actuator assembly including a movable member being movable in a predetermined direction relative to the vent opening for restricting fluid flow through the vent opening, the actuator assembly having an actuator for generating a pressure within a second cavity defined by a liner, said liner being configured to receive and engage the movable member, wherein the pressure generated by the actuator causes the liner and the moveable member to move in the predetermined direction under predetermined first deployment conditions, said actuator being independently activated with respect to said inflator; and
    the air bag module has a selectable ratio between the first cross-sectional area and the second cross-sectional area, the selectable ratio being a predetermined value so that the volume of inflator gas discharged into the air bag cushion and the volume of inflator gas expelled out through the vent opening of the plate is controlled.

2. The air bag module as in claim 1, wherein the plurality of diffuser openings are disposed radially around an annular side wall of the diffuser.

3. The air bag module as in claim 1, wherein the plate is disposed below the diffuser, the vent opening being disposed below the plurality of diffuser openings and the plurality of discharge ports.

4. The air bag module as in claim 1, wherein the actuator is a pyrotechnic device.

5. The air bag module as in claim 1, wherein the actuator assembly is actuated under full level deployment conditions so that the inflator gas flows to the air bag cushion and is prevented from flowing according to the second fluid path.

6. The air bag module as in claim 1, wherein the selectable ratio between the first cross-sectional area of the diffuser openings and the second cross-sectional area of the vent opening is increased to provide greater inflation of the air bag cushion due to a greater volume of inflator gas flowing into the air bag cushion.

7. The air bag cushion as in claim 1, wherein the selectable ratio between the first cross-sectional area of the diffuser openings and the second cross-sectional area of the vent opening is decreased to provide a lesser level of inflation of the air bag cushion.

8. The air bag module as in claim 1, wherein the first cross-sectional area is increased by increasing the number of diffuser openings or by varying the dimensions of the diffuser openings.

9. The air bag module as in claim 1, wherein the first cross-sectional area is decreased by decreasing the number of diffuser openings or by varying the dimension of the diffuser openings.

10. The air bag module as in claim 1, wherein the actuator assembly is opened at a predetermined time during inflation of the air bag cushion, wherein the predetermined time for moving the member is determined in response to a predetermined condition of the vehicle.

11. The air bag module as in claim 1, wherein the cavity is substantially annular.

12. The air bag module as in claim 1, wherein the plate has an opening for receiving the inflator therein.

13. The air bag module as in claim 1, wherein the diffuser comprises a cushion retainer for securing the air bag cushion to a base plate.

14. The air bag module as in claim 1, wherein the plate comprises a base plate for securing the air bag module to the vehicle.

15. The air bag module as in claim 1, further including a pad retainer having a first surface and a second surface, the first surface being disposed adjacent the plate and the second surface being disposed adjacent an adapter plate, wherein the pad retainer, the plate and the adapter plate include openings formed therein, the openings defining the vent opening.

16. The air bag module as in claim 1, wherein the actuator assembly includes a housing for retaining the actuator to the plate, and for slideably receiving the liner and the movable member.

17. The air bag module as in claim 1, wherein the movable member comprises a slide.

18. The air bag module as in claim 1, wherein the movable member comprises a stopper which plugs the vent opening upon actuation of the actuator.

19. An airbag module as in claim 1, wherein said module has a low level deployment condition and a full level deployment conditions, said actuator is not activated during said low level deployment condition.

20. A device as in claim 1, wherein said actuator is activated at the same time as said initiator.

21. The air bag module as in claim 1, further comprising a liner shell seated within the second cavity defined by the liner such that said pressure being generated within the liner shell causes the liner, the liner shell and the moveable member to move in the predetermined direction.

22. A device for variably inflating an air bag, comprising:
    a) a housing defining an interior volume, said housing having a vent aperture providing fluid communication between said interior volume and the exterior of said housing;
    b) an inflatable air bag being secured to said housing, said air bag being in fluid communication with said interior volume through a plurality of openings in said housing;
    c) an inflator for releasing gas into said interior volume;
    d) a fluid flow restriction member being movably mounted to said housing between a first position and second position, said fluid flow restriction member restricts fluid flow from said interior volume to said air bag as said fluid flow restriction member moves from said first position to said second position;

e) a liner configured to receive and retain a portion of the fluid flow restriction member, said liner defining a cavity; and f) an actuator for increasing pressure in said cavity such that the increased pressure causes said liner, and said fluid flow restriction member to move from said first position to said second position.

23. A device as in claim 22, wherein said actuator is a pyrotechnically activated device.

24. A device as in claim 23, wherein said actuator is activated in response to a signal received from a controller.

25. A device as in claim 23, wherein said actuator is activated in response to a signal received from a controller, said signal being delayed by said controller.

26. A device as in claim 24, wherein said controller determined the level of deployment of said air bag.

27. The device as in claim 22, further comprising a liner shell seated within said cavity.

28. An air bag module, comprising:

an air bag cushion;

an inflator being activatable to discharge inflator gas for inflating said air bag cushion, said inflator having a plurality of discharge ports through which the inflator gas is discharged;

a diffuser having a cavity disposed adjacent to said inflator, said diffuser having a plurality of diffuser openings formed therein to provide fluid communication between said cavity and said air bag cushion, said plurality of diffuser openings providing a first fluid path between said inflator and said air bag cushion, said diffuser openings having a first cross-sectional area;

a plate disposed about said inflator, said plate including a vent opening for providing a second fluid path to expel the inflator gas from said air bag module, said vent opening having a second cross-sectional area;

an actuator assembly including a movable member being movable relative to said vent opening for restricting fluid flow through said vent opening, said actuator assembly having an independent actuator for increasing pressure within a cavity of a liner connected to said movable member, said increased pressure moving the movable member and said liner, said actuator being independently activated with respect to said inflator; and said air bag module having a selectable ratio between said first cross-sectional area and said second cross-sectional area, said selectable ratio being a predetermined value so that the volume of inflator gas discharged into said air bag cushion and the volume of inflator gas expelled out through said vent opening is controlled.

29. The air bag module as in claim 28, wherein said actuator assembly further includes a housing for retaining said independent actuator to said plate, and slideably retaining said liner, and said movable member within said housing.

30. The air bag module as in claim 29, further comprising a liner shell seated within said cavity.

31. An air bag module for restraint of an occupant in a vehicle, the air bag module comprising:

an air bag cushion;

an inflator being activatable to discharge inflator gas for inflating the air bag cushion, the inflator having a plurality of discharge ports through which the inflator gas has discharged;

a diffuser having a cavity disposed adjacent the inflator, the diffuser having a plurality of diffuser openings formed therein to provide fluid communication between the cavity and the air bag cushion, the plurality of diffuser openings providing a first fluid path between the inflator and the air bag cushion, the diffuser openings having a first cross-sectional area;

a plate disposed about the inflator, the plate including a vent opening which provides a second fluid path to expel the inflator gas from the air bag module, the vent opening having a second cross-sectional area;

an actuator assembly including a movable member being movable relative to the vent opening for restricting fluid flow through the vent opening, the actuator assembly having an actuator for moving the movable member under predetermined first deployment conditions, said actuator being independently activated with respect to said inflator, said movable member having a horizontal portion and a vertical portion defining a generally L-shape; and the air bag module has a selectable ratio between the first cross-sectional area and the second cross-sectional area, the selectable ratio being a predetermined value so that the volume of inflator gas discharged into the air bag cushion and the volume of inflator gas expelled out through the vent opening of the plate is controlled, wherein said movable member further comprises a bent portion between the horizontal and vertical portions, respectively.

32. The air bag module as in claim 31, wherein the plurality of diffuser openings are disposed radially around an annular side wall of the diffuser.

33. The air bag module as in claim 31, wherein the plate is disposed below the diffuser, the vent opening being disposed below the plurality of diffuser openings and the plurality of discharge ports.

34. The air bag module as in claim 31, wherein the actuator is capable of generating pressure for moving the member.

35. The air bag module as in claim 31, wherein the actuator assembly is actuated under full level deployment conditions so that the inflator gas flows to the air bag cushion and is prevented from flowing according to the second fluid path.

36. The air bag module as in claim 31, wherein the selectable ratio between the cross-sectional area of the diffuser openings and the second cross-sectional area of the vent opening is increased to provide greater inflation of the air bag cushion due to greater volume of inflator gas flowing into the air bag cushion.

37. The air bag module as in claim 31, wherein the selectable ratio between the first cross-sectional area of the diffuser openings and the second cross-sectional area of the vent opening is decreased to provide a lesser level of inflation of the air bag cushion.

38. The air bag module as in claim 31, wherein the first cross-sectional area is increased by increasing the number of diffuser openings or by varying the dimensions of the diffuser openings.

39. The air bag module as in claim 31, wherein the first cross-sectional area is decreased by decreasing the number of diffuser openings or by varying the dimension of the diffuser openings.

40. The air bag module as in claim 31, wherein the actuator assembly is opened at a predetermined time during inflation of the air bag cushion, wherein the predetermined time for moving the member is determined in response to a predetermined condition of the vehicle.

41. The air bag module as in claim 31, further including a pad retainer having a first surface and a second surface, the first surface being disposed adjacent the plate and the second surface being disposed adjacent an adapter plate, wherein the pad retainer, the plate and the adapter plate include openings formed therein, the openings defining the vent opening.

42. The air bag module as in claim 31, wherein the actuator assembly includes a housing for retaining the actuator, a liner and the movable member.

43. The air bag module as in claim 31, wherein said module has a low level deployment condition and a full level deployment conditions, said actuator is not activated during said low level deployment condition.

* * * * *